Aug. 25, 1936.                    C. E. DRUMHELLER                    2,052,087
        MECHANISM FOR AND METHOD OF MAKING HIGHLY ELASTIC, PLAIN KNITTED
                    FABRIC CONTAINING RUBBER LIKE STRANDS
                Filed Jan. 19, 1934              19 Sheets-Sheet 1

Fig.1.

Inventor:
Charles E. Drumheller,
by Emery, Booth, Varney and Townsend
                                Attys.

Aug. 25, 1936.     C. E. DRUMHELLER     2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934     19 Sheets-Sheet 2
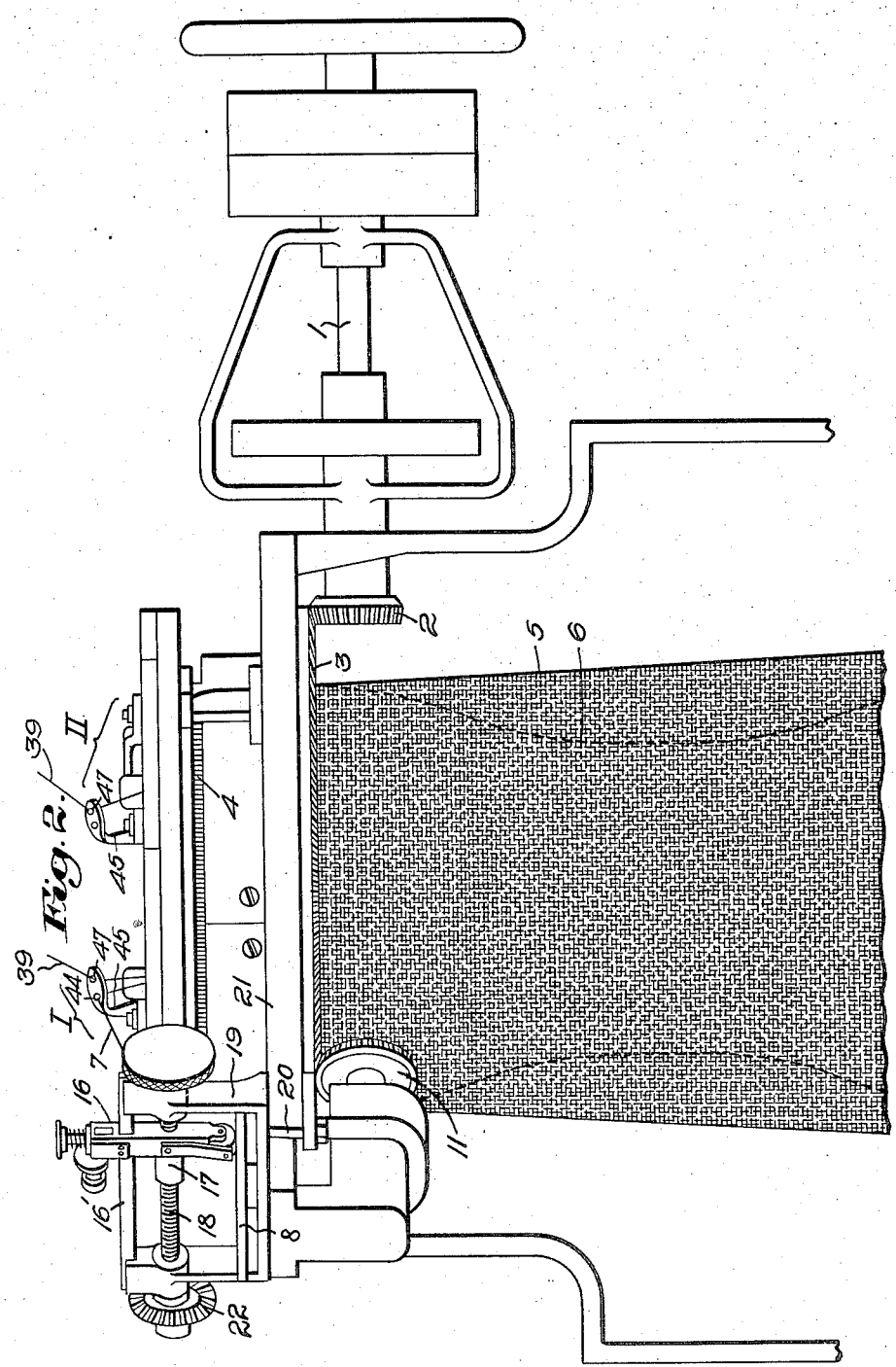

Aug. 25, 1936.  C. E. DRUMHELLER  2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934   19 Sheets-Sheet 3
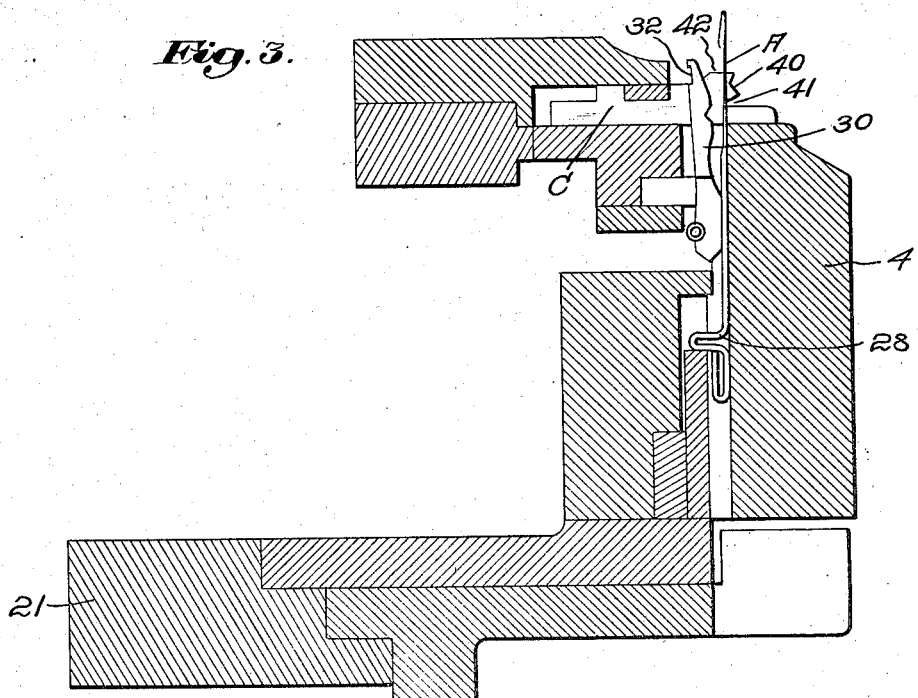
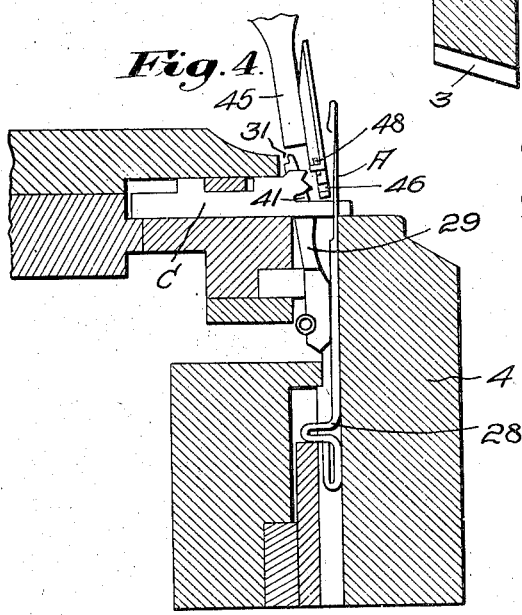
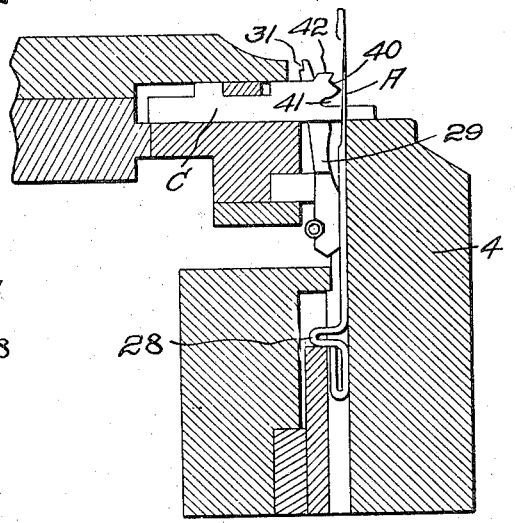
Inventor:
Charles E. Drumheller
Attys.

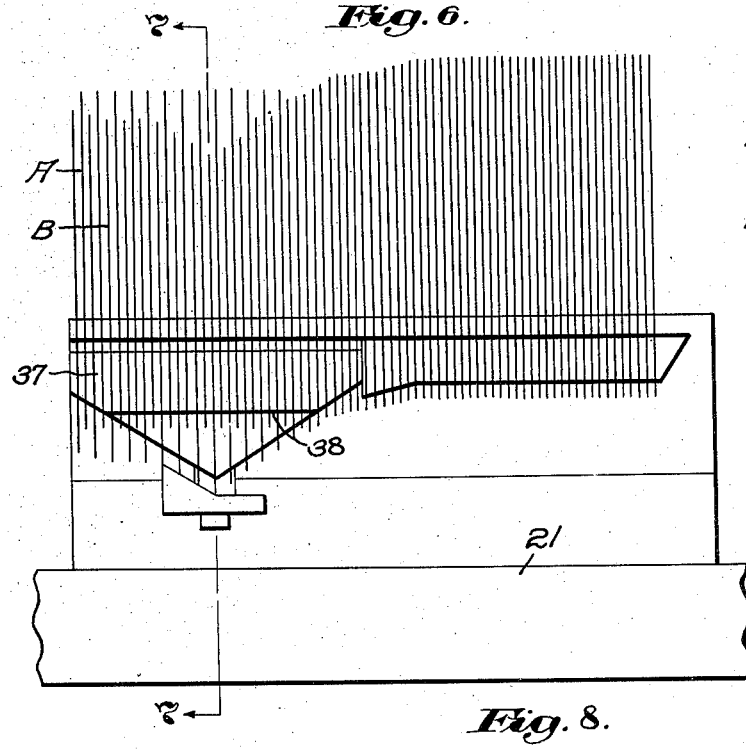
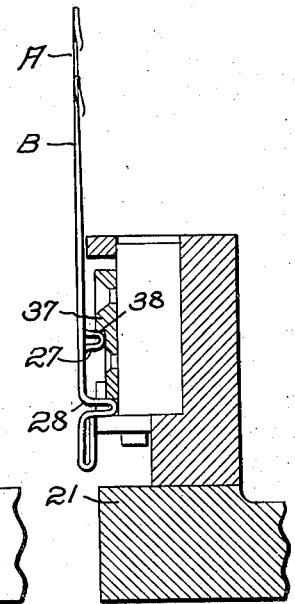
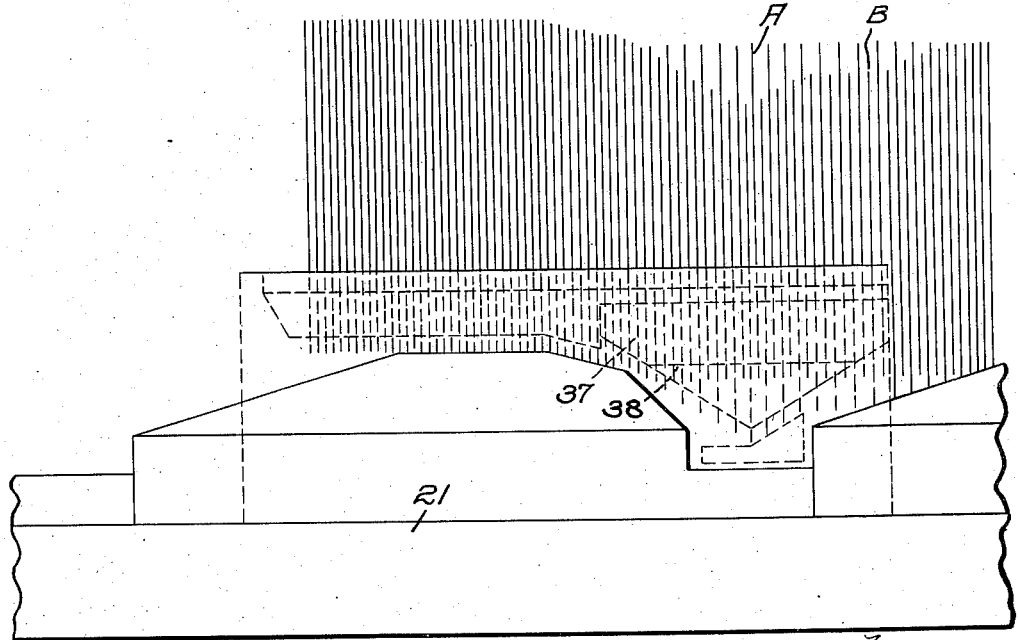

Aug. 25, 1936.  C. E. DRUMHELLER  2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934  19 Sheets-Sheet 5

Inventor:
Charles E. Drumheller
by Emery, Booth, Varney and Townsend Attys

Aug. 25, 1936.  C. E. DRUMHELLER  2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934  19 Sheets-Sheet 7

Inventor:
Charles E. Drumheller,
by Emery, Booth, Varney and Townsend
Attys.

Inventor:
Charles E. Drumheller,
by Emery, Booth, Varney and Townsend
Attys.

Aug. 25, 1936.  C. E. DRUMHELLER  2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934  19 Sheets-Sheet 10

Inventor:
Charles E. Drumheller,
by Eney, Booth, Vany and Townsend
Attys

Aug. 25, 1936.    C. E. DRUMHELLER    2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934    19 Sheets-Sheet 12

Inventor:
Charles E. Drumheller
by Emery, Booth, Varney and Townsend
Attys.

Aug. 25, 1936.                C. E. DRUMHELLER                2,052,087
    MECHANISM FOR AND METHOD OF MAKING HIGHLY ELASTIC, PLAIN KNITTED
              FABRIC CONTAINING RUBBER LIKE STRANDS
                  Filed Jan. 19, 1934        19 Sheets-Sheet 13
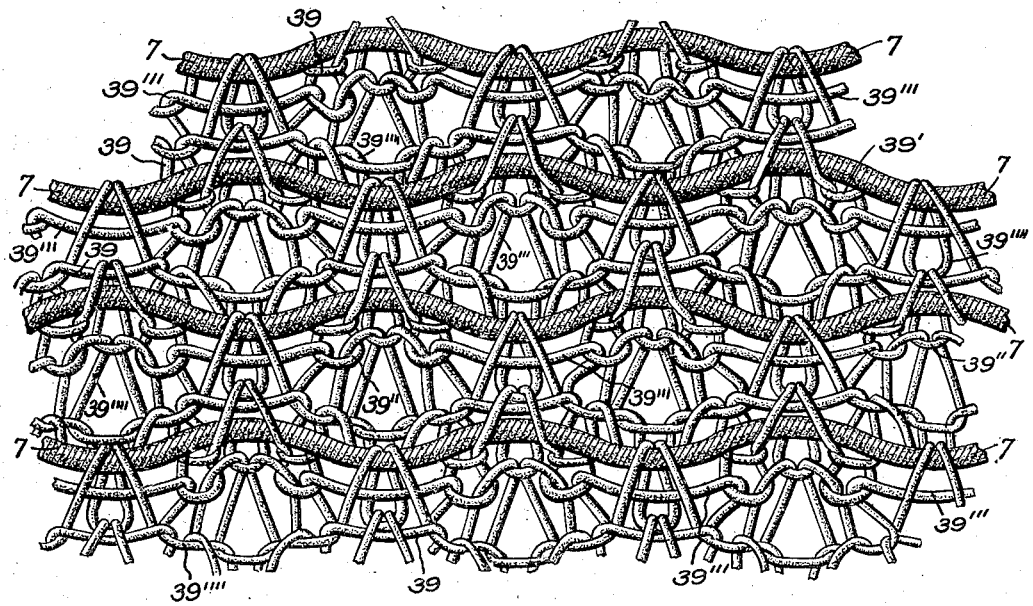
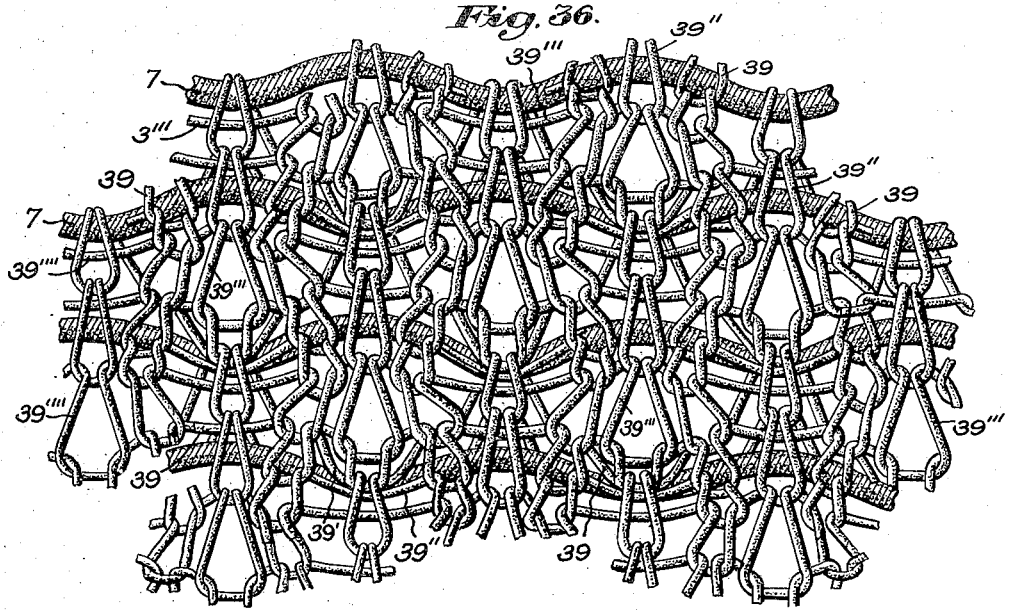

Aug. 25, 1936. C. E. DRUMHELLER 2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934 19 Sheets-Sheet 14
Fig. 32.
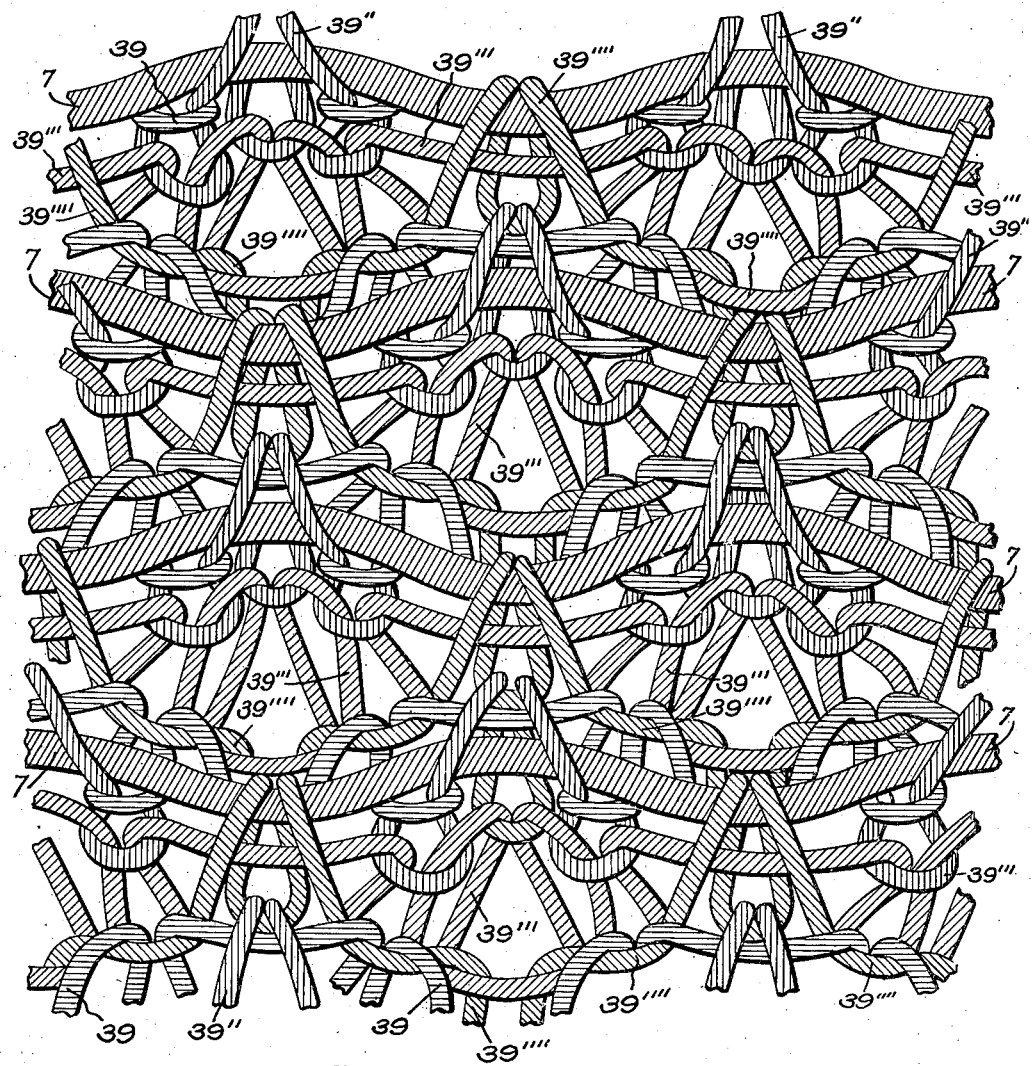
Fig. 32.a
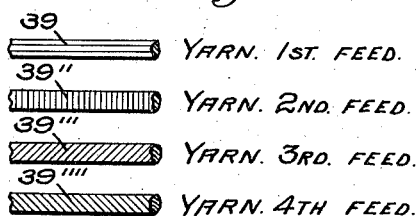
Inventor:
Charles E. Drumheller,
by Emery, Booth, Varney and Townsend
Attys.

Aug. 25, 1936.  C. E. DRUMHELLER  2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934   19 Sheets-Sheet 15
Fig. 38
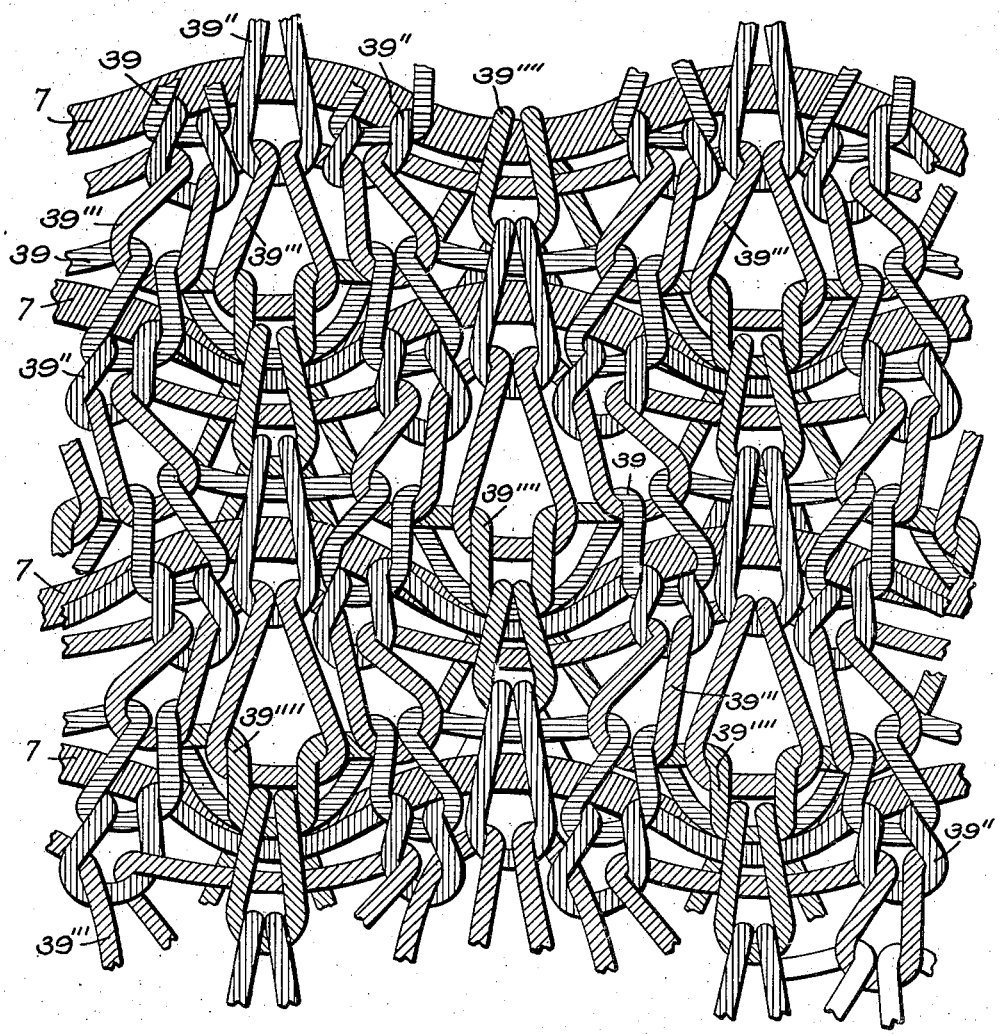
Fig. 38ª
39    YARN. 1ST. FEED.
39"   YARN. 2ND. FEED.
39''' YARN. 3.RD. FEED.
39''''YARN. 4.TH FEED.
Inventor:
Charles E. Drumheller,
by Emery, Booth, Varney and Townsend
Attys.

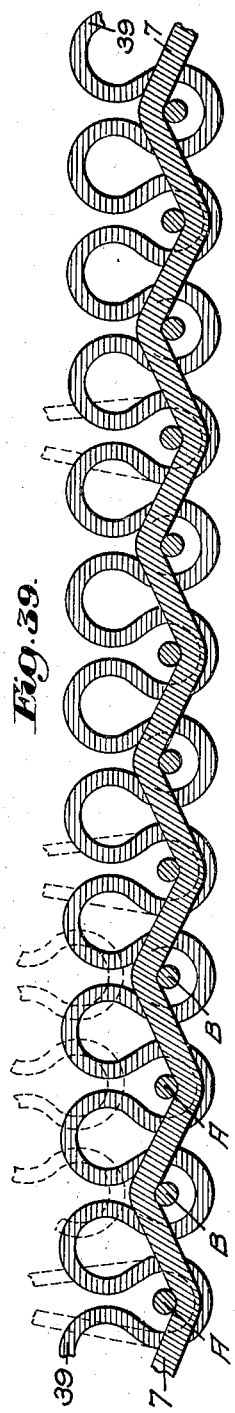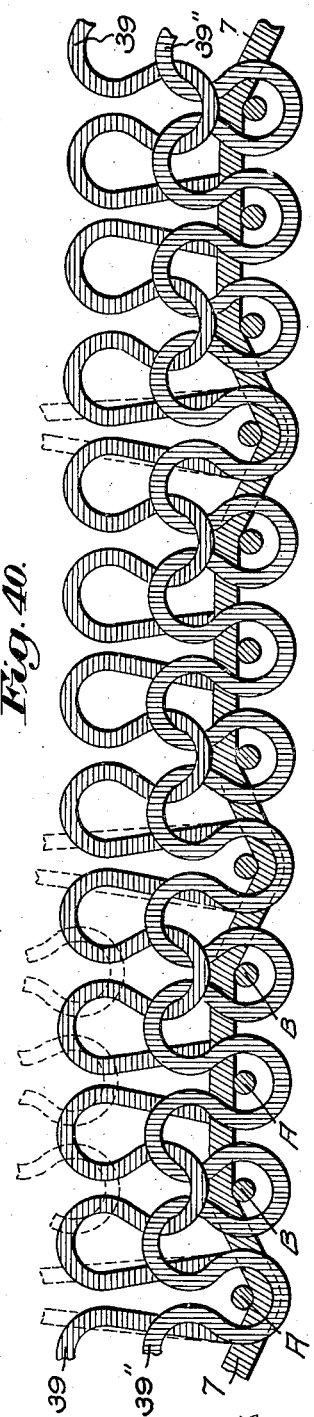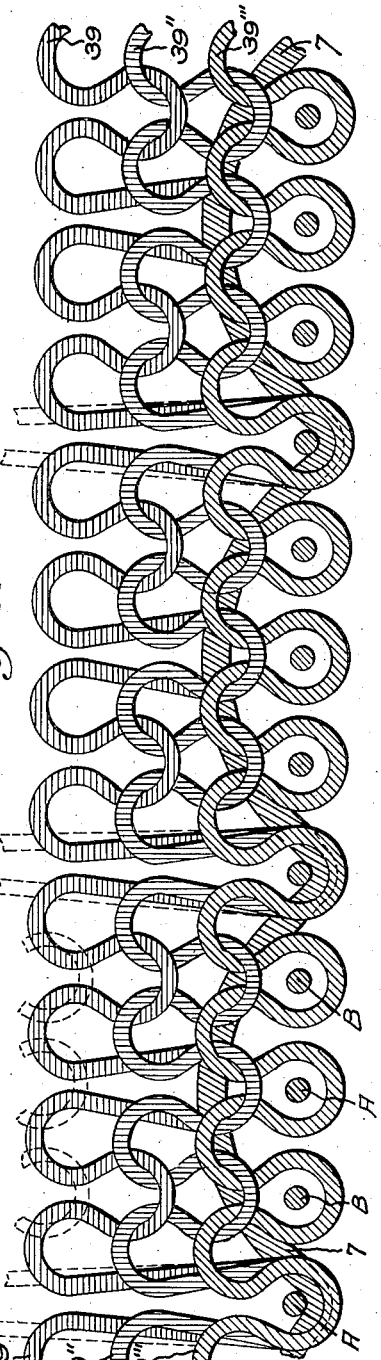

Aug. 25, 1936.    C. E. DRUMHELLER    2,052,087
MECHANISM FOR AND METHOD OF MAKING HIGHLY ELASTIC, PLAIN KNITTED
FABRIC CONTAINING RUBBER LIKE STRANDS
Filed Jan. 19, 1934    19 Sheets-Sheet 17
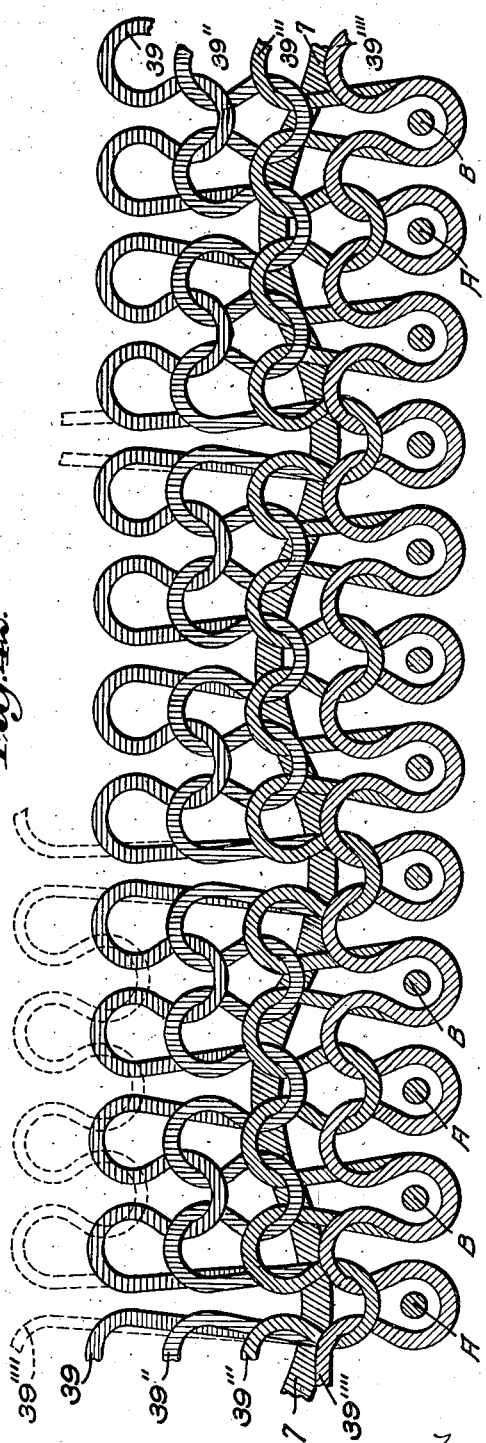
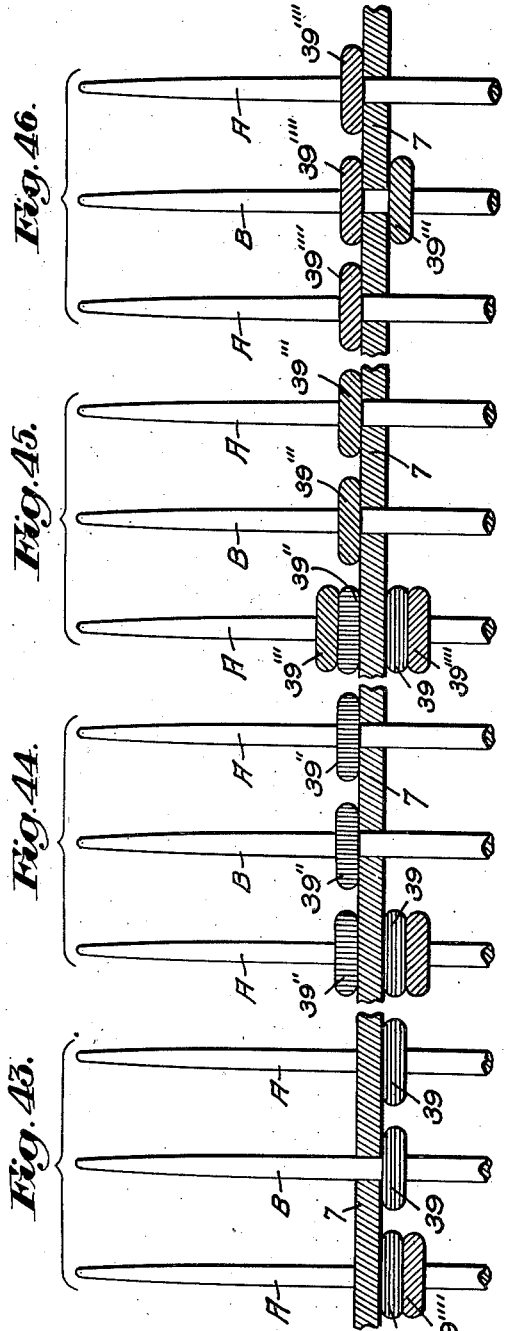
Inventor
Charles E. Drumheller Aug. 25, 1936.                          C. E. DRUMHELLER                    2,052,087
       MECHANISM FOR AND METHOD OF MAKING HIGHLY ELASTIC, PLAIN KNITTED
                       FABRIC CONTAINING RUBBER LIKE STRANDS
                         Filed Jan. 19, 1934          19 Sheets-Sheet 18
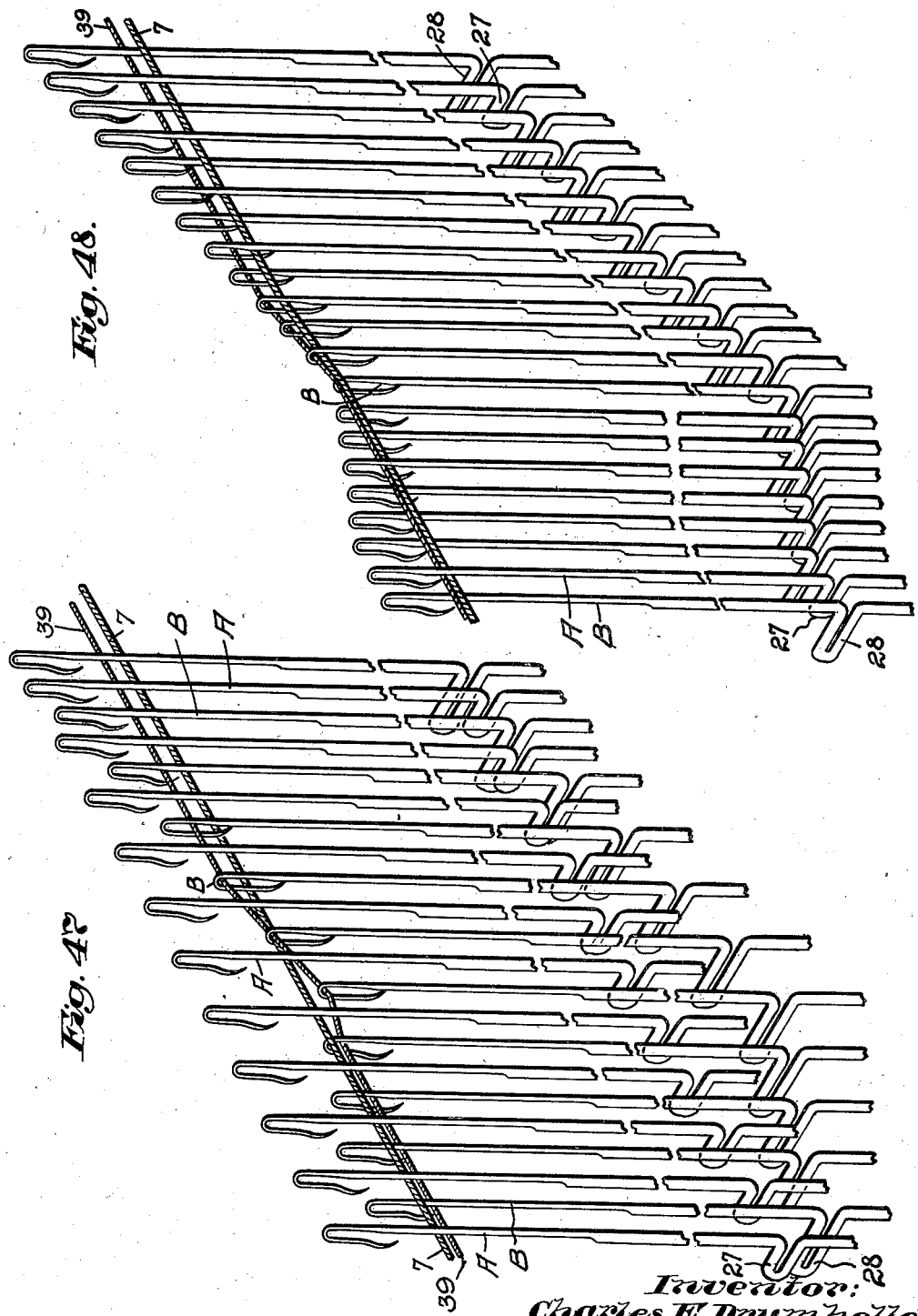

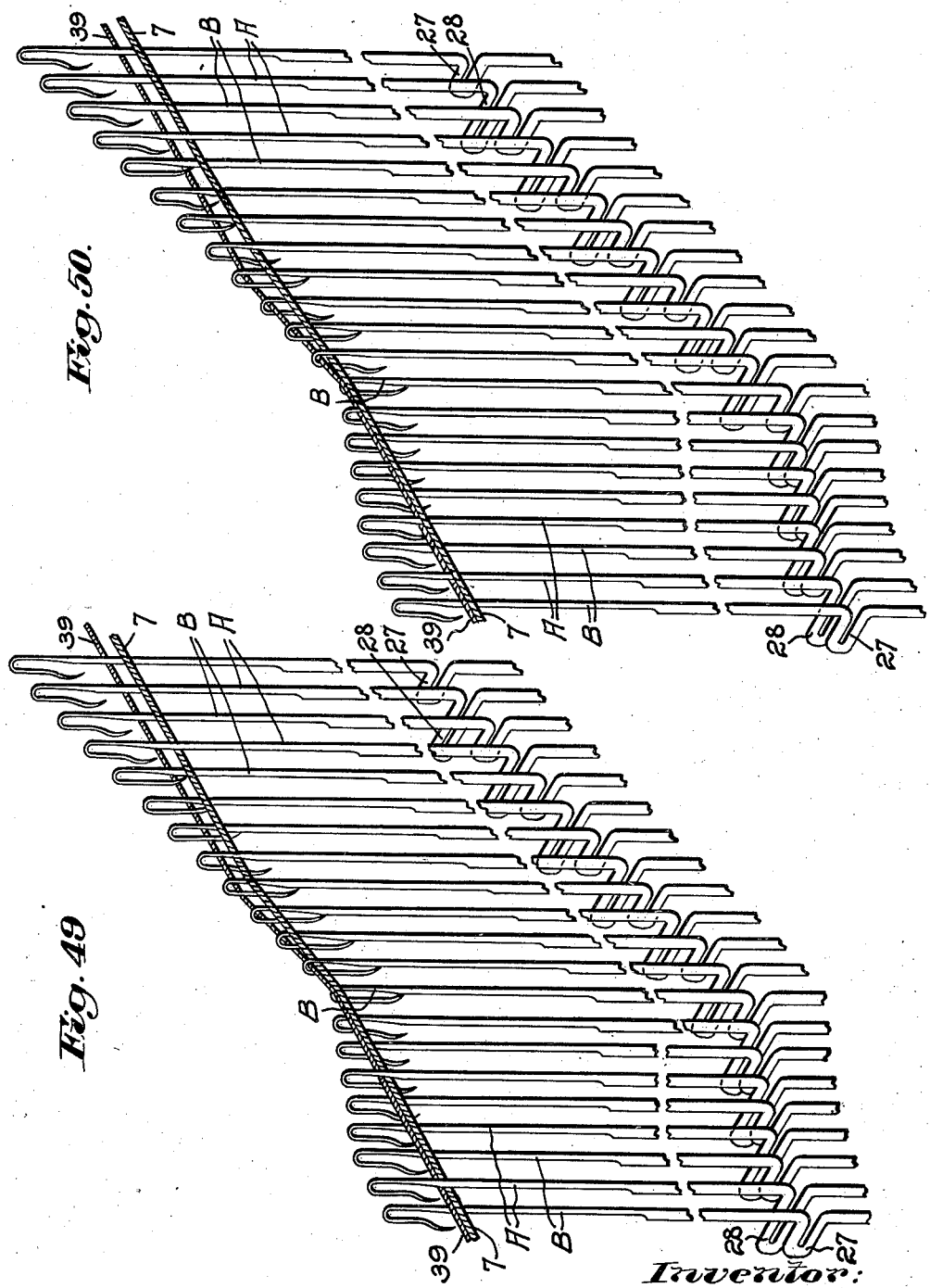

Patented Aug. 25, 1936

2,052,087

UNITED STATES PATENT OFFICE 2,052,087

MECHANISM FOR AND METHOD OF MAKING HIGHLY ELASTIC, PLAIN KNITTED FABRIC CONTAINING RUBBER-LIKE STRANDS

Charles E. Drumheller, Springfield, Mass., assignor to The William Carter Company, Needham Heights, Mass., a corporation of Massachusetts Application January 19, 1934, Serial No. 707,259

9 Claims. (Cl. 66—12)

This invention relates to mechanism for and to the related method of making highly expansible, plain knitted fabric containing rubber-like strands.

In order that the principle of the invention may be readily understood, I have disclosed in the accompanying drawings one form of mechanism of my invention and upon or by which my method may be practised and by which a novel fabric may be made, said fabric being claimed in my copending application Ser. No. 707,260, filed Jan. 19, 1934.

In said drawings,—

Fig. 1 is a top plan view of a circular knitting machine whereon the fabric of my invention may be produced;

Fig. 2 is a front elevation of the said machine and representing the fabric as depending therefrom, the said fabric in full lines being represented as of constantly increasing diameter and in dotted lines as "fashioned" or "shaped", that is, as having contracted or enlarged portions;

Figure 9:
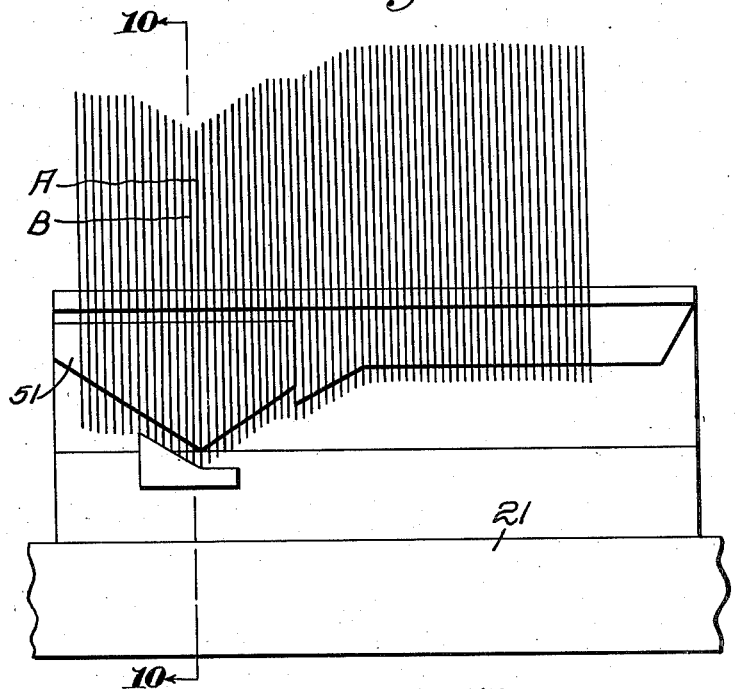
Figure 10:
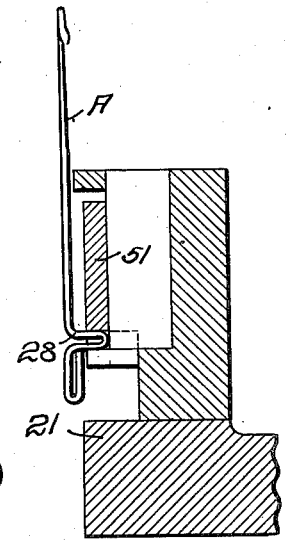
Figure 11:
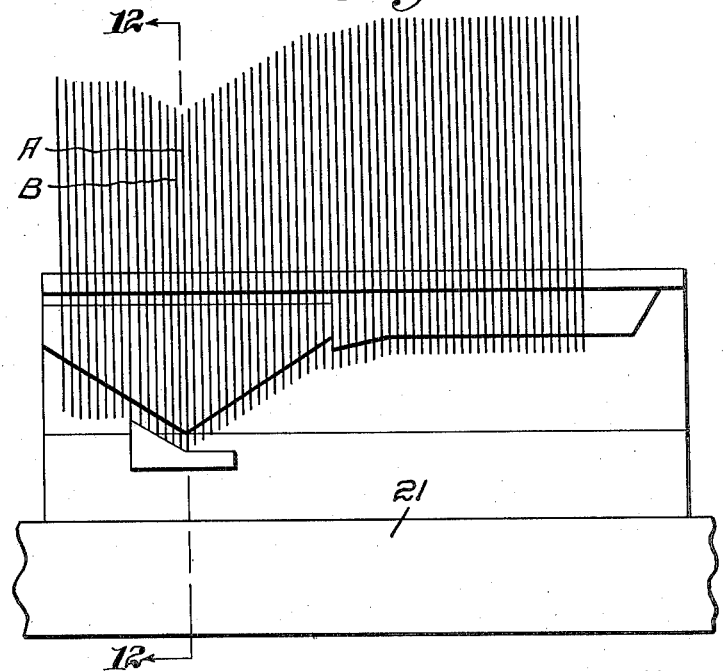
Figure 12:
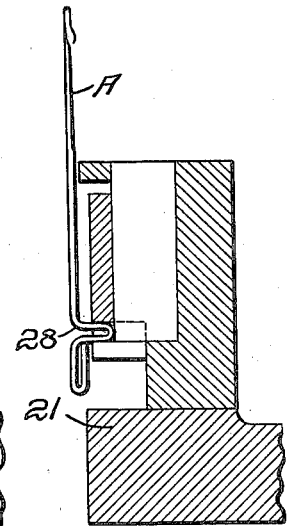
Figure 13:
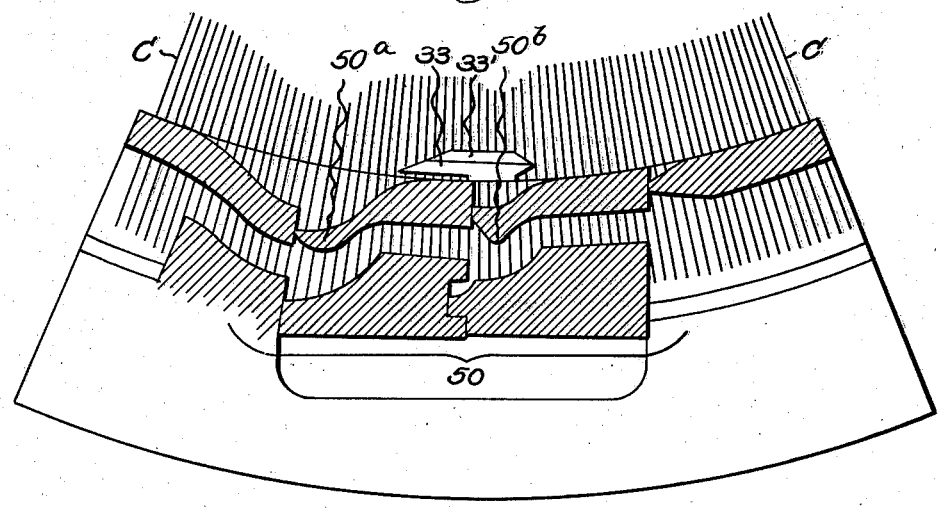
Figure 14:
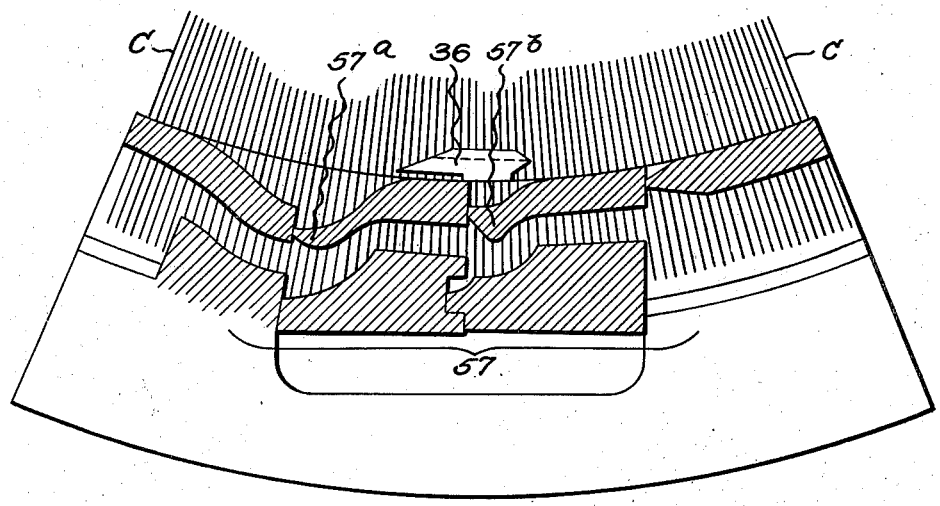
Figure 15:
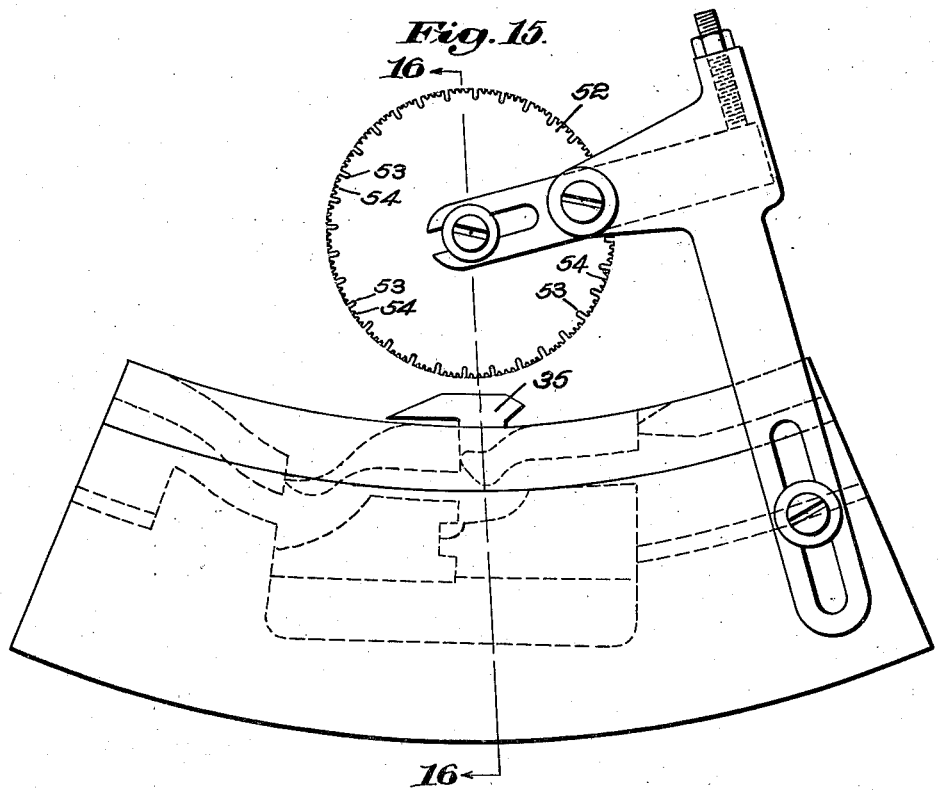
Figure 16:
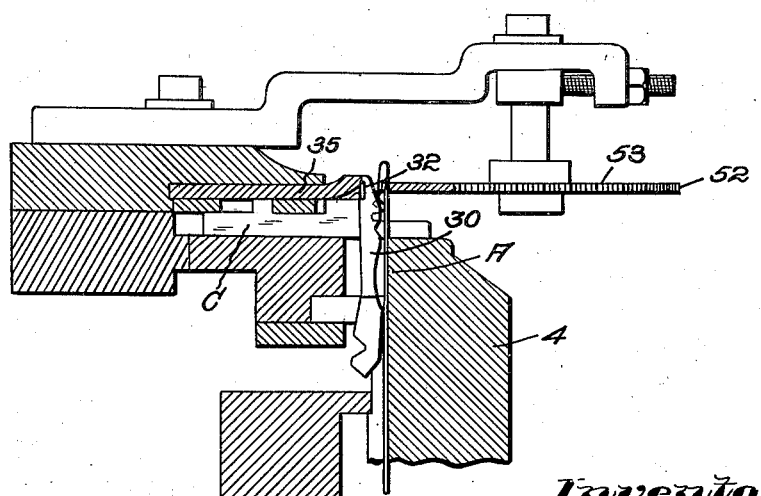
Figure 17:
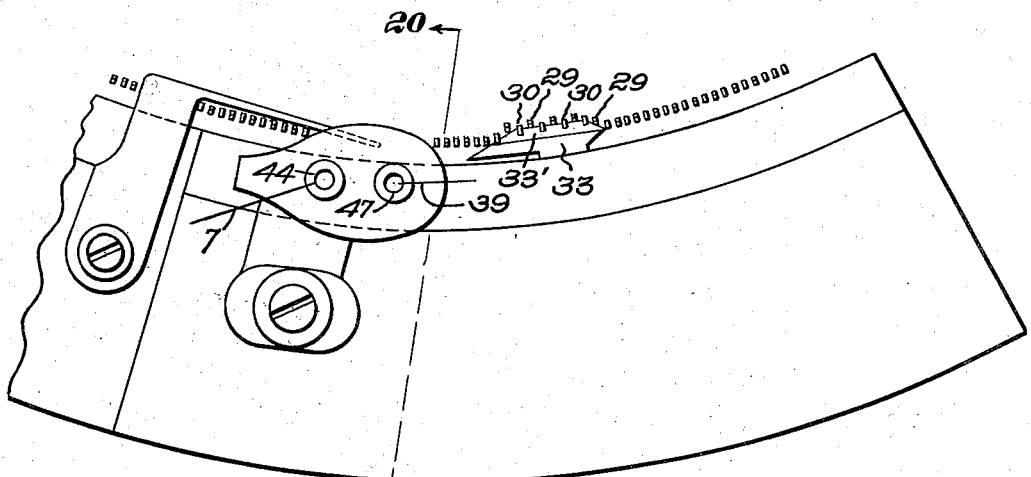
Figure 18:
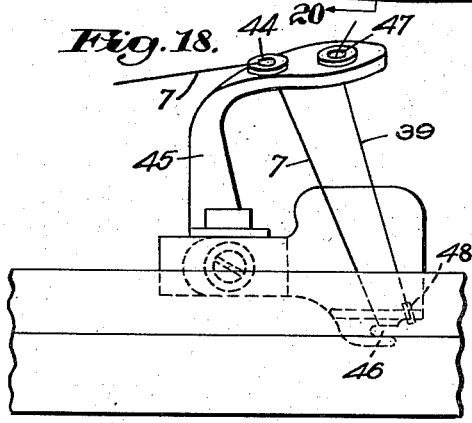
Figure 19:
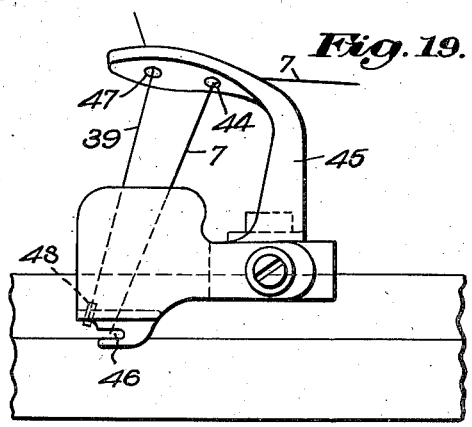
Figure 20:
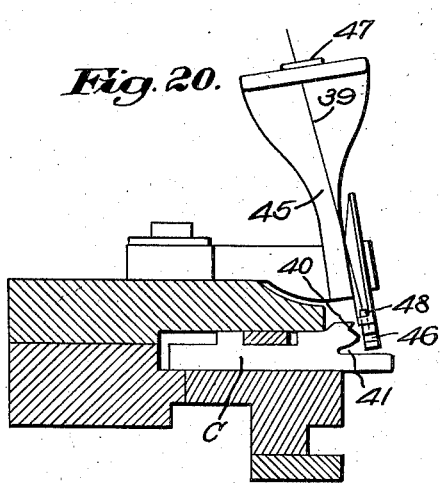
Figure 21:
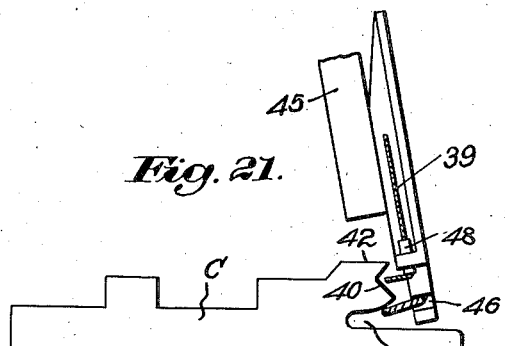
Figure 22:
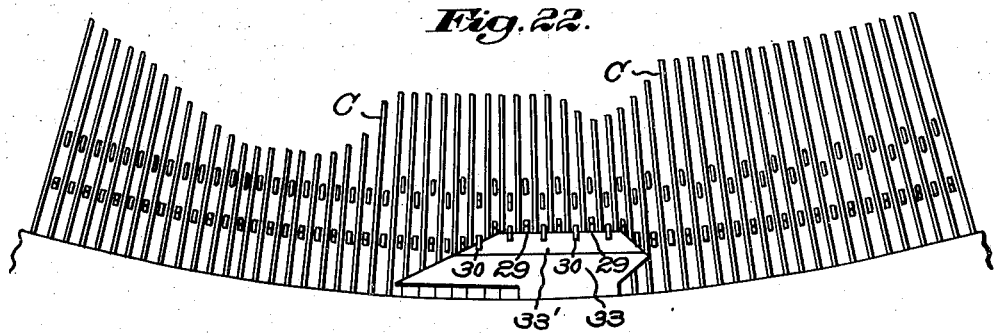
Figure 23:
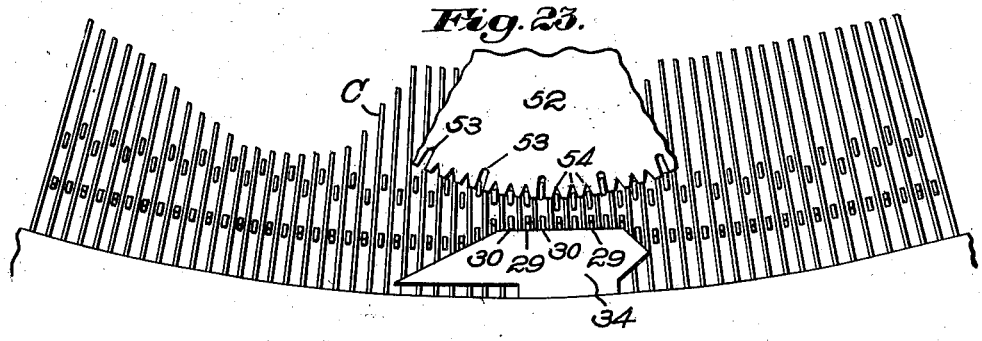
Figure 24:
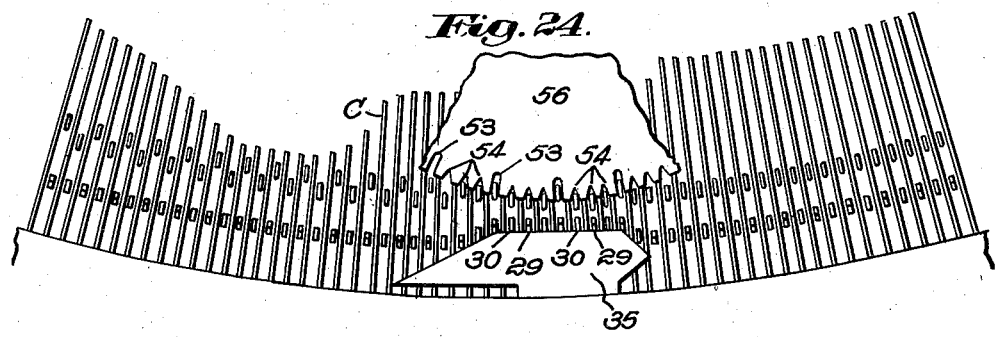
Figure 25:
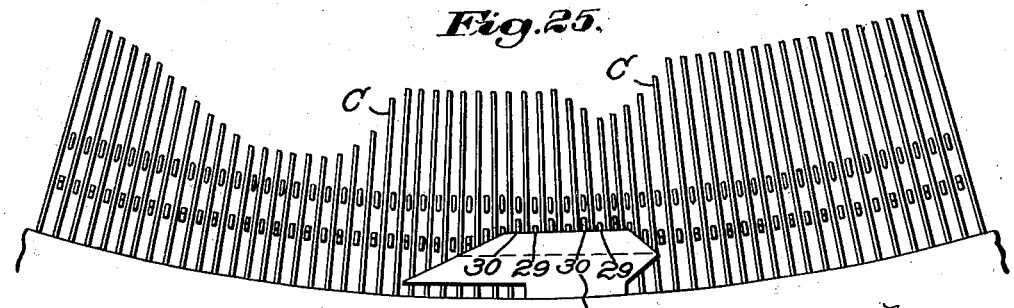
Figure 26:
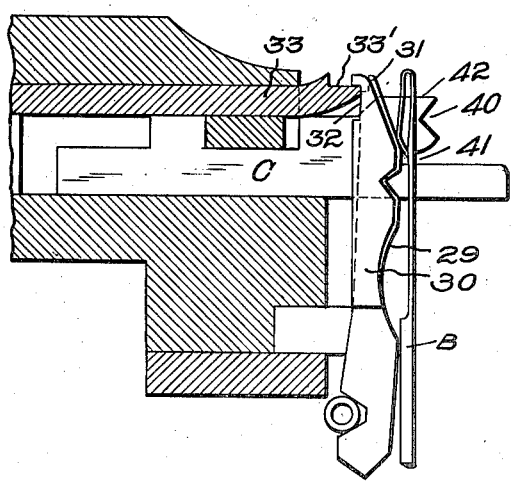
Figure 27:
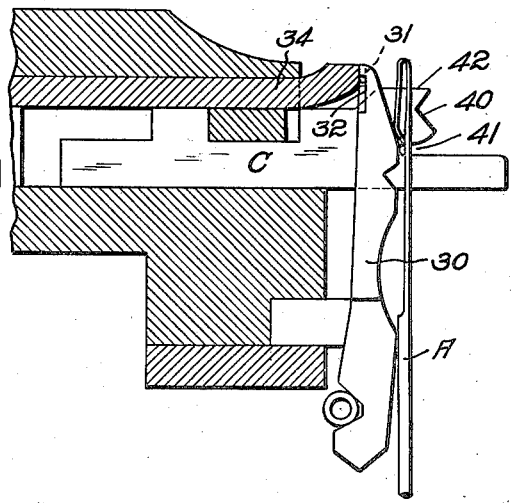
Figure 28:
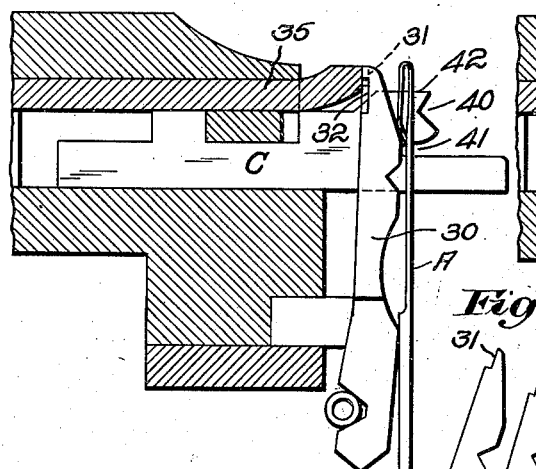
Figure 30:
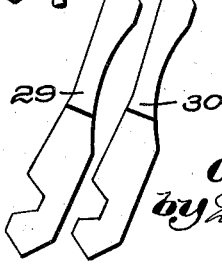
Figure 31:
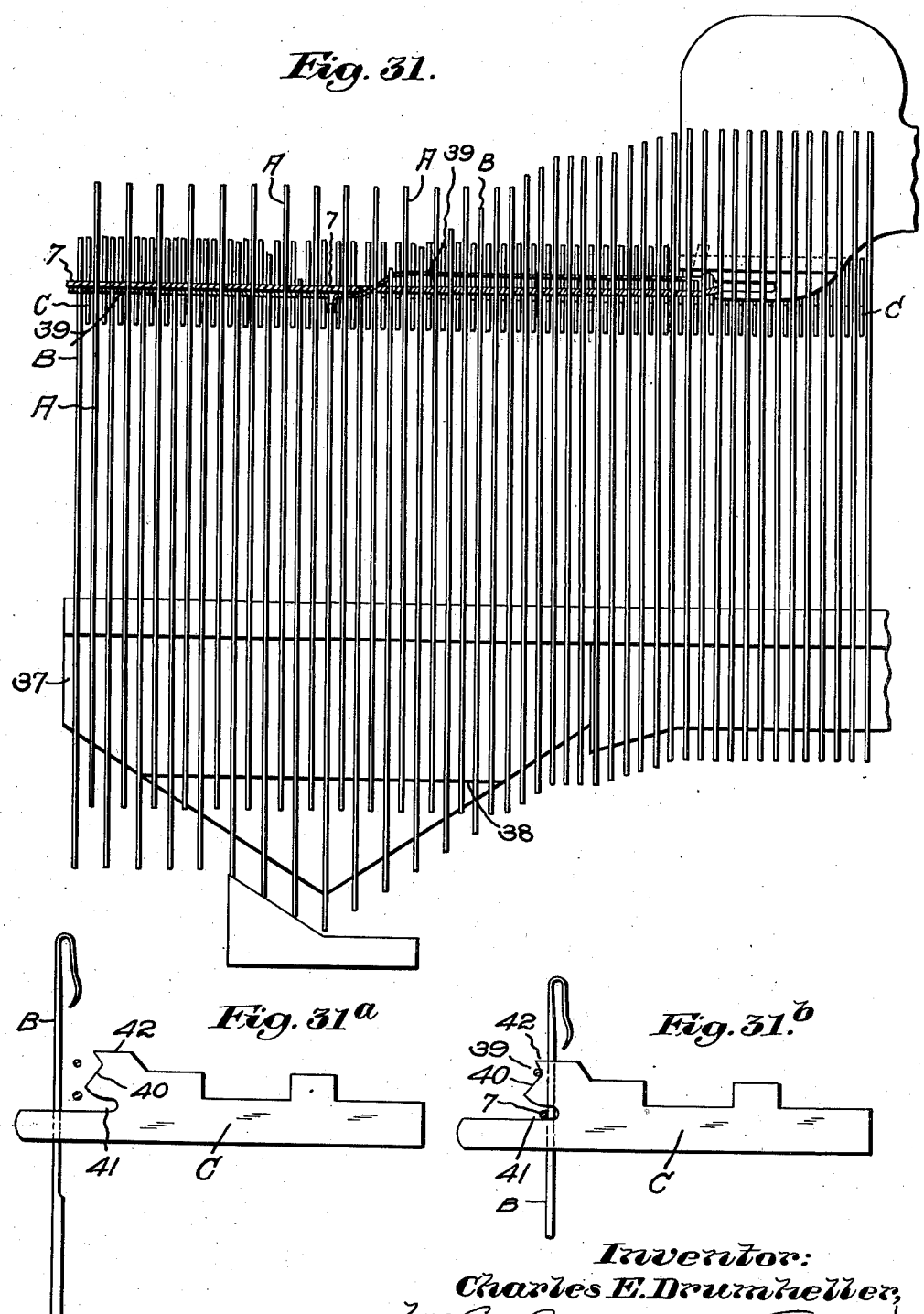
Figure 32:
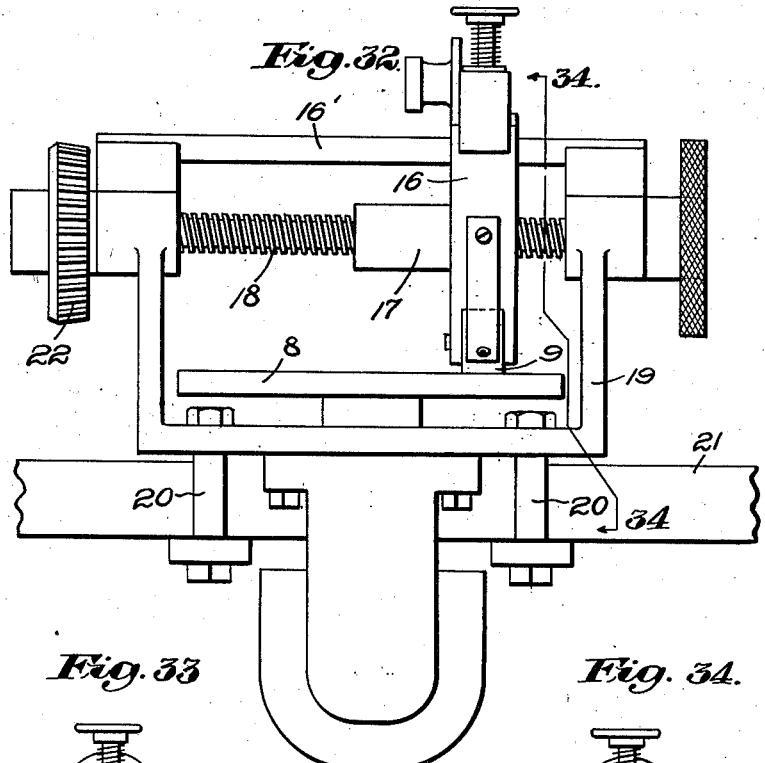
Figures 33, 34:
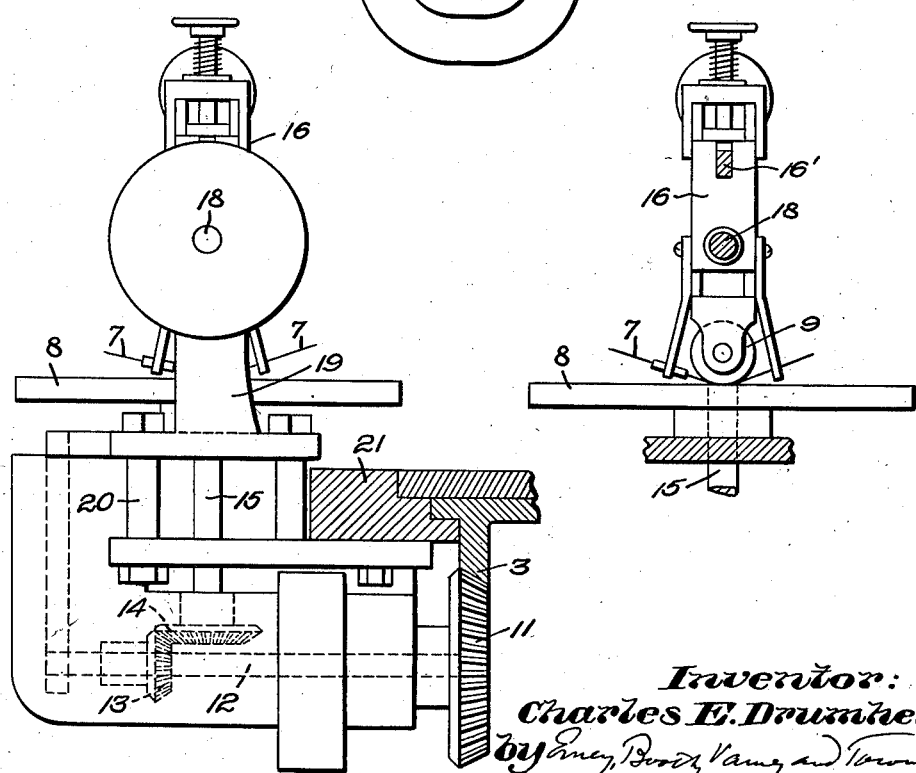

Figs. 3, 4 and 5 are vertical sections taken through the machine on lines 3—3, 4—4 and 5—5 of Fig. 1;

Fig. 6 is a side elevation of sufficient of the machine shown in Fig. 1 to represent the stitch drawing cams at the first feed thereof looking outwardly;

Fig. 7 is a vertical section upon the line 7—7 of Fig. 6 looking in the direction of the arrows thereon;

Fig. 8 is a view similar to Fig. 6 but looking inwardly at the point upon which the section Fig. 7 is taken;

Fig. 9 is a view similar to Fig. 6 but at the second or third feed of the machine;

Fig. 10 is a vertical section upon the line 10—10 of Fig. 9 looking in the direction of the arrows thereon;

Fig. 11 is a view similar to Fig. 6 but at the fourth feed of the machine;

Fig. 12 is a vertical section upon the line 12—12 of Fig. 11 looking in the direction of the arrows thereon;

Fig. 13 is in part a plan and in part a horizontal section at the first feed, to represent the sinker cams;

Fig. 14 is a view similar to Fig. 13 but at the fourth feed of the machine;

Fig. 15 is a plan view of the sinker cams and the pattern wheel at the second or third feed of the machine;

Fig. 16 is a vertical section on the line 16—16 of Fig. 15 with the pattern wheel and its bracket in elevation;

Fig. 17 is a plan view of the yarn or thread guide bracket at the first feed and the closely related parts;

Fig. 18 is an outside elevation of the yarn or other guide bracket and its support of Fig. 17;

Fig. 19 is an inside elevation but otherwise similar to Fig. 18;

Fig. 20 is a vertical section on the line 20—20 of Fig. 17;

Fig. 21 is an enlarged detail in elevation to show a sinker and the relation thereto of the usual knitting thread or yarn and the rubber-like strand;

Figs. 22 to 25 are plan views at the first, second, third and fourth feeds respectively to show the presser cam and in Figs. 23 and 24 to show the pattern wheels, said views also showing the pressers, sinkers and needles;

Figs. 26 to 29 are vertical sections to show the pressers, needles and sinkers at the first, second, third and fourth feeds respectively;

Fig. 30 is a detail in side elevation showing the alternating pressers employed throughout the machine;

Fig. 31 is an inside elevation of the needles, cams and yarn or thread feeds at the first feed and showing also the rubber-like strand introduced only at said feed;

Figs. 31a and 31b are details in side elevation to show a needle and a sinker and representing in Fig. 31b the manner of introducing the yarn or thread and the rubber-like strand;

Fig. 32 is a front elevation of means for controlling the tension of the rubber-like strand;

Fig. 33 is an end elevation partly in vertical section of the mechanism shown in Fig. 32;

Fig. 34 is a view partly in elevation and partly in vertical section of the means shown in Fig. 32;

Fig. 35 is an outside or back view of a completed portion of the knitted fabric, much enlarged; that is to say, a view of the fabric after it has passed the first, second, third and fourth feeds;

Fig. 36 is an inside or front view of the same fabric;

Figs. 37 and 38 are views corresponding to Figs. 35 and 36 respectively, but enlarged thereover and wherein the yarn or thread at each of the first, second, third and fourth feeds and the rubber-like strand are contrastingly designated or hatched;

Figs. 37a and 38a are charts indicating the contrasting hatching of the yarns or threads at the first, second, third and fourth feeds;

Figs. 39, 40, 41 and 42 are somewhat diagrammatic representations of the yarns or threads and the rubber-like strand at the first, the second, the third and the fourth feeds respectively;

Figs. 43 to 46 are diagrams to show a group of three needles as they function at each feed and the stitches accumulated thereon at said several feeds; and Figs. 47 to 50 are diagrammatic perspective views to show the position of the yarns or threads, and the rubber-like strands with respect to the beards of the needles at the first, second, third and fourth feeds.

The machine of my invention is intended to knit a plain fabric as contrasted with a rib fabric. By "plain" fabric I mean one knitted upon a single series or set of needles. While said fabric might be knitted either as a straight or as a tubular fabric, I prefer to knit the same as a tubular or circular fabric and preferably upon a machine having spring beard needles, though my invention is not restricted thereto. While the machine may be of various types, I have chosen to represent the same as of the general Wildman type, wherein only cylinder needles are provided, said needles being mounted in a rotary needle cylinder for independent reciprocation at each of a plurality of feeds herein four in number, as more fully hereinafter set forth.

It has heretofore been proposed to introduce a rubber-like strand into knitted fabrics, but heretofore so far as I am aware this has mainly been accomplished by laying a strip or strand of rubber or a strand of rubber-like material between the needles of a rib knitting machine in a wholly straight condition. It has also been attempted to introduce strands or rubber or rubber-like material to the needles of a circular machine not provided with a dial, but so far without commercial success so far as I am aware.

An important purpose of my invention is to introduce a rubber-like strand into the fabric in such a way as to render the fabric very highly expansible both in a direction transverse to the needle wales and in a direction lengthwise thereof. While my invention is not restricted to the introduction of any particular rubber-like strand, I have obtained the best results by employing a rubber-like strand, and which consists of a core of unvulcanized material, such, for example, as rubber juice suitably coagulated in water and then wrapped with a very fine covering of silk or other suitable material, the composite strand being of very fine diameter and which I have succeeded in feeding in the manner hereinafter described, to spring beard needles of a circular knitting machine, which heretofore has not been accomplished with rubber or rubber-like strands, so far as I am aware.

While my invention is not restricted to any particular type of knitting machine nor to the use of spring beard needles, I will proceed to describe as one example of my invention a circular knitting machine of the general Wildman type but modified in accordance with my invention to enable the machine to receive the rubber-like strand and knit the same into the fabric in such a manner as to render the fabric very highly expansible not only transversely but lengthwise.

An important feature of my invention, to which the extreme elasticity of the fabric I believe to be largely due in co-ordination with the introduction of the rubber-like strand, is the varying of the stitch structure, as, for example, by employing tuck stitches at predetermined intervals and in such a manner that the rubber-like strand is positioned or incorporated in the yarn or thread stitches in such a way and is so co-ordinated therewith that said rubber-like strand is more or less in a corrugated, slightly wavy, or kinky condition, as will be hereinafter more fully explained with particular reference to Figs. 35 to 38. Moreover, the rubber-like strand is in this embodiment of my invention introduced only at one of the feeds of the machine which are herein represented as four in number. Furthermore the rubber-like strand is constantly under tension control, so that the article may be shaped as desired during the knitting operation, whereby the tubular fabric will be either of uniform diameter throughout or of a uniformly tapering character or the fabric may be irregularly shaped with contracted and enlarged zones wherever desired.

It will be understood that I use the term "tuck stitches" in a broad sense, to include draw stitches, and other like stitch variations.

I will first describe as far as may be necessary the general structure of the machine and then point out the novel features thereof.

Referring first to Figs. 1 and 2 and 32, 33, 34, the main drive shaft of the machine is indicated at 1 in Fig. 2. By means of bevel gear 2 and cylinder gear 3 a movement of constant rotation is imparted to the needle cylinder 4 having spring beard needles shown in numerous figures of the drawings. Preferably I provide four feeds and have indicated the same in plan view in Fig. 1 as I, II, III and IV. The structure at each of said feeds will be hereinafter described. The fabric is indicated generally at 5 in Fig. 2, it being there shown as of a constantly increasing diameter, and at 6 I have indicated in dotted lines thereon a variation in the shape of the fabric effected by the tension control upon the rubber-like strand. I have in Fig. 1 represented said strand generally at 7 and as shown in that figure as well as in Figs. 2 and 32, 33, 34 the said rubber-like strand passes through a tension controller having a horizontally positioned constantly-driven disk 8 contacting with which is a roller 9. The rubber-like strand 7 is fed between said disk and roller and in order to vary the rate of feeding the said rubber-like strand and therefore the tension thereon, the said roller 9 is moved automatically toward and from the axis of rotation of the said disk 8. While this may be accomplished in any suitable manner, I have in said figures represented the disk 8 as constantly rotated from the cylinder gear 3 upon the needle cylinder meshing with a bevel pinion 11 on a stud shaft 12 having a bevel pinion 13 meshing with a bevel pinion 14 on a short upright shaft 15 whereon said disk 8 is fast. The said roller 9 is rotatably mounted in a member or standard 16 guided by a bar 16' and provided with a nut 17 adapted to travel to and fro along a screw 18 mounted in a suitable U-shaped bracket 19 which is secured by bolts 20 to the framing 21 of the machine. The screw 18 has fast thereon a bevel pinion 22 meshing with and driven by bevel pinion 23 shown in Fig. 1 as fast on a short horizontal shaft 24 provided with a push ratchet 25 and a pull ratchet 26 which are respectively pushed and pulled by pawls (not shown) controlled by a suitable pattern mechanism. In this or in any other suitable manner, the rubber-like strand is constantly fed under tension control and said tension is varied at any or all times desired throughout the knitting operation.

Figure 29:
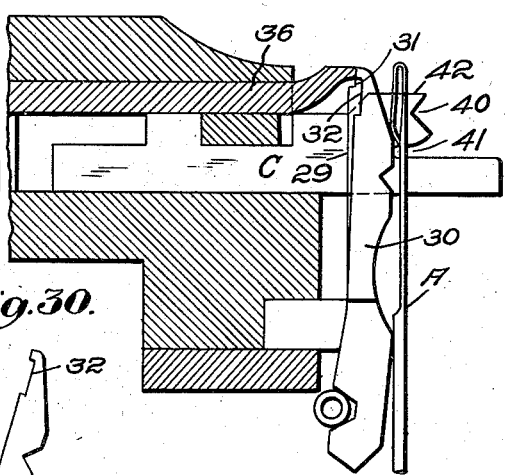

In the particular example of knitting mechanism selected for illustration of means for carrying out my method and producing my novel fabric (which latter is claimed in my co-pending application Ser. No. 707,260), but to which my invention is obviously not limited, I preferably, as stated, employ spring beard needles of which alternate needles have short butts 27 and the intervening needles have long butts 28. Individual pressers are provided for the needles and they are preferably of the character shown in Fig. 30 at 29 and 30, respectively. The needles having the short butts 27 I herein term needles A and the needles having the long butts 28 I herein term needles B. The individual pressers 29 therefore act upon the long butt needles B and the individual pressers 30 therefore act upon the short butt needles A to close the beards thereof at the proper time, as indicated in the various figures of the drawings. The pressers 29 are termed top cut pressers because of the recessed formation 31 at the extreme upper edge thereof and the pressers 30 are termed bottom cut pressers because of the recessed formation 32 slightly spaced from the extreme top of the presser, thereby permitting the said bottom cut pressers to be acted upon at their extreme upper edge as shown in Fig. 29 and in other figures, and as will be more fully hereinafter described. The said pressers are of standard construction and in this embodiment of the mechanism of my invention, they alternate throughout the machine.

Fixed, so-called main presser cams are employed at the respective feeds to act upon the said pressers respectively, the said presser cams being indicated at 33, 34, 35, 36 in plan in Figs. 22, 23, 24, 25, respectively, and in vertical section in Figs. 26, 27, 28, 29, respectively. As shown most clearly in Fig. 26, the presser cam 33 is recessed at its front edge at 33' so as not to act upon the pressers 30; the presser cams 34 and 35 are not cut away at their front edges, with the result that they both act upon both types of pressers 29 and 30; and the presser cam 36 is shaped at its front edge as shown in Fig. 29 so that it acts only on the pressers 30.

It has heretofore been stated that there are four feeds I, II, III, IV. It is only at feed I that the rubber-like strand is introduced. It would be impossible in a machine of the standard Wildman construction, or any other machine of standard construction known to me, to introduce a rubber-like strand without change in the structure of the cooperating parts. In order to permit the described introduction, I have as the result of a great deal of experimentation employed a stitch or pull-down cam 37 shown most clearly in Figs. 6, 7, 31, etc. and have recessed or milled away the inner face of the cam about ⅛ of an inch in depth, at 38, below the top thereof, so that the said cam will not draw down the A needles, but will permit them to remain substantially elevated as they move across the face of the cam 37, as indicated in Figs. 6, 7 and 31, as well as in the diagram, Fig. 47. Said latter figure discloses the positioning of the needles and the introduction of the regular knitting yarn and the rubber-like strand at the first feed.

The sinkers employed by me in the production of the fabric of my invention are changed from the standard construction in the following manner: The sinkers employed by me are represented at C in the various figures and are shown on a large scale in Figs. 21, 31a and 31b. The usual knitting yarn or thread which may be of silk or any other suitable material, as, for example, cotton or rayon, is represented at 39 in the various figures, and it will be noted that the said thread at the first feed is received at the proper time in the upper notch 40 of the sinker. The usual lower notch of the standard sinker would not be of sufficient size to receive and effect the proper manipulation of the rubber-like strand 7 and therefore I have cut away or enlarged the lower notch as indicated at 41. Also I have cut down the upper end or top of the sinker indicated at 42, to a substantial extent, preferably about .025, in order that the pattern wheel or circular plain presser can act over the top of the sinker at the back of the needle to press the same.

At said first feed the rubber-like strand 7 is led through an eye 44, clearly shown in Figs. 17, 18, 19, of a guide 45 and then, as shown most clearly in Figs. 19 and 21, is led into a recess or slot 46, which is positioned substantially at or very slightly above the top of the enlarged lower notch 41 of the sinker. At said first feed the regular knitting yarn or thread 39 of any desired character is introduced through the eye 47 of the guide 45, and then through a lower guide eye 48 positioned as shown most clearly in Figs. 18 to 21, so that the said regular knitting thread is directly received in the upper notch 40 of each sinker. If desired, the said rubber-like strand 7 may be guided as indicated at 49 in Fig. 1 intermediate the tensioning means and the guide 45.

At the said first feed where the usual knitting thread and the rubber-like strand are both introduced, every other needle remains elevated; that is to say, the A needles remain elevated and the B needles are drawn down in customary manner; in other words, the short butt needles remain elevated and the long butt needles are drawn down. The regular knitting thread 39 is, therefore, engaged only by the beards of the B needles, said thread being taken at about the usual point in the descent of the said needles B.

The sinkers are moved outwardly by their cams which are shown in cross section at 50 in Fig. 13. It will be observed that the said sinkers are advanced slightly at the cam portion 50a and again at the cam portion 50b of the said cam 50. By the said cam structure, the sinkers are pushed forward (that is, toward the threads). The shape of the cam structure is such that after the stitch has been formed, the sinkers are pulled back and release the stitch from their throats as the needles pull down, so that the stitches on the needles may be properly cast off.

A similar structure with the same resulting operation as employed at the second and third feed shown in dotted lines in Fig. 15, also is employed at the fourth feed hereinafter referred to.

Still referring to the first feed, it will be understood that the beard of each needle B as it is descending is closed before the point of the beard reaches the rubber-like strand 7 that is in the throats of the sinkers. The stitch of the silk thread 39 is later cast off, (namely at No. II feed) the described action being effected, as will be observed, without the said rubber-like strand 7 being incorporated into the knitted stitches, and as will be seen from the diagram Fig. 47, neither the rubber-like strand 7 nor the regular thread 39 is taken by the A needles, but the sinkers will indent, kink or corrugate both the threads at all the needles, thereby very exactly measuring the loops next to be formed.

I will next refer to the structure at the feed No. II shown in plan in Fig. 1. At said feed No. II, desirably located about six inches from feed No. I, all of the needles, (namely, needles A and needles B) will be drawn down together because the draw-down cam 51 at said second feed (shown in Figs. 9 and 10) is not recessed as is the draw-down cam at the first feed. At said second feed I, however, provide a presser device or element which is preferably a rotatable pattern wheel 52, shown in plan in Fig. 1, and a small portion only of which is shown on a large scale in Figs. 23 and 24. The said presser wheel 52 is here shown as a three and one presser (that is to say, it is provided with a deep notch 53 at every fourth needle and a more shallow notch 54 at very other needle). Any other type of pattern device or pattern wheel may be here employed. Instead of using a three and one presser wheel, I may use a two and one, or a four and one, etc. presser wheel according to the pattern that is to be provided in the fabric.

As stated, all the needles (both A and B needles) are drawn down together at the second feed, and therefore will all knit. At said second feed there is provided a guide 55, but only the usual knitting thread is introduced as, for example, a silk one. In the specific structure herein represented, the unpressed needle at the second feed namely, the needle that cooperates with the deeper notch 53 is behind (that is, cooperates with) the individual presser 30 of Fig. 30 (namely, a presser for an A needle). Said needle that enters the notch 53 is not pressed.

It is to be understood that in the disclosed type of machine upon which the fabric of my invention is knitted (but to which my invention is not limited) the stitches formed or partly formed at the first feed are cast off at the second feed; those formed or partly formed at the second feed are cast off at the third feed; those formed or partly formed at the third feed are cast off at the fourth feed; and those formed or partly formed at the fourth feed are cast off at the first feed. This is a continuous operation throughout the knitting of the fabric, except where certain of the needles are or may be arranged to take more than one stitch.

As already stated, at the first feed all the B needles have taken a loop of the usual knitting thread 39 into their beards. The rubber-like strand 7 is not received in the beards of the said B needles, but lies at the back or shank side of the said needles. Neither the regular knitting thread 39 nor the rubber-like strand 7 is taken into the hooks of the A needles at the first feed, but both said thread 39 and said strand 7 are bent, kinked or corrugated about the stems or shanks of the said needles below their beards, whereby the proper length of the stitches is measured.

As the second feed, both the A and the B needles are pressed off because all the needles are drawn down at the second feed, the draw-down cam not being recessed as at the first feed. At said second feed, however, the first of every group of four needles is not pressed because in this embodiment or example of my invention, the first of every four needles is received in the deep notch 53 (see Fig. 23).

At the said first feed, the stitches are not completed at the A needles, although the thread 39 and strand 7 are indented or corrugated about the shanks of said needles. At the second feed, stitches are completed at both the A needles and the B needles with the exception of one needle in every four at said second feed, because of the employment of the pattern wheel 52. I again here state that instead of using a three and one presser, I may use any other desired pattern of presser.

It will be understood from the foregoing description that the rubber-like strand 7 at the first feed lies outside of all the A needles (namely, at the side of said needles next the observer) and that the said rubber-like strand 7 lies at the back of all the B needles at the said first feed, and that at periodic needles of the said first feed the rubber-like strand 7 passes off the top of said B needles during their descent, as, for example, beginning at about the fifth or sixth B needle in the drawing down action at said first feed.

The said rubber-like strand 7 at the described point passes from its contact with the needle at about the point where a stitch of the regular knitting thread 39 is cast off. The said rubber-like strand, however, is at this point not yet absolutely knitted into the fabric but is lying therein, in a position to be incorporated into the fabric (at the second feed).

At the second feed all the needles (that is, both the A and the B needles) take a regular knitting thread 39 introduced at that feed and all said needles A and B knit such silk or other thread.

At feed No. III the construction of parts is the same as at feed No. II, and therefore at said feed No. III is provided a pattern wheel 56 having a deep notch 53 for the first needle of every group of four and a shallow notch 54 for each of the next three needles. It has been stated that at feed No. I the individual pressers 29 press the B needles. At the second and third feeds all the needles are pressed excepting that, as stated, the first of every four needles, being received in a deep notch 53 of a presser wheel 52 or 56, is not pressed.

It will be understood that at both the second and the third feeds, and referring to each of four needles in immediate succession as needles a, b, c, d, needle a will take a stitch of the silk thread 39 and will take the rubber-like strand 7 under its beard, but that said stitch will not be cast off at said feed. The next three needles b, c, d, will all take on a stitch of the silk thread 39 and will cast off the previous stitches on said needles respectively. The rubber-like strand 7, however, misses said three needles b, c, d, at this feed. What I have here stated is true for every group of four needles a, b, c, d at feed No. II. At feed No. III the same thing happens as at feed No. II.

Before describing what happens at feed No. IV, reference is made to Fig. 1 where there is the usual guide 55 but used only for the introduction of a silk or regular knitting thread, no rubber-like strand being introduced at the fourth feed.

At feed No. IV all the needles (that is to say, both the A needles and the B needles) take in the beards thereof a loop of the silk thread 39, as at feed No. I, excepting that A needles press off and the B needles tuck.

At the said feed No. IV the arrangement of individual pressers 29, 30 of Fig. 30 is one of alternation since, as already described, such alternation of pressers is used throughout the entire circle of needles. At the said feed No. IV all the A needles are being pressed by their individual pressers. Therefore the needles which at feed No. II and feed No. III did not press off their stitches because of the pattern wheels 52, 56 provided thereat, which caused the needles merely to form a tuck stitch, cast off their stitches at the said fourth feed, including the rubber-like strand.

While I have specifically referred to four feeds, I may employ eight feeds introducing a rubber-like strand at the first and fifth feeds. The cams for the control of the sinkers at the fourth feed are represented at 57 in Fig. 14, it having cam portions 57a and 57b.

Viewing Figs. 35 to 38, it will be observed that the openings in the fabric are so related to each other as to provide a diamond or lozenge effect. This is because, following the formation of the openings in one course, the like openings next occurring are in needle wales too removed from the needle wales in which the openings first referred to occur. This result, to which, however, my invention is not limited, is brought about by the use of the proper number of needles in the entire needle circle. In order that this may be clearly understood, I will give as one example only, the number of needles which I may and preferably do employ as compared with the regular Wildman machine. Where in a regular Wildman machine 804 needles are provided in the needle cylinder, I provide 802 needles, the cylinder being specially cut for this purpose. Each of the two pattern wheels 52, 56 is provided with 156 notches. Dividing 802 (the number of needles) by the number of said notches, leaves 22, which deducted from 156 (the number of notches) leaves 34, which divided by 4 gives a result of 8 with 2 left over. The numeral 4 in this connection indicates the grouping of the notches 53, 54 of each of said pattern wheels 52, 56. The two left over in this example represent the two needle wales by which the pattern progresses, as indicated in Figs. 35 to 38.

I have, in Figs. 35 and 36 on a large scale, illustrated the fabric which is formed in the manner hereinbefore described. Before referring in detail to said figures or to Figs. 37 and 38, wherein is shown the same fabric with differentiated hatching for the threads at the respective feeds, I will refer to the diagrammatic Figures 39 to 46, which will make clear the positioning of the usual knitting thread 39 and the rubber-like strand 7 at each of the said feeds.

Referring first to Fig. 39, the silk thread or usual knitting thread is represented at 39 and the rubber-like strand at 7, and the hatching here employed is the same as that used in Figs. 37 and 38. In said diagram Fig. 39 are represented twelve consecutive needles beginning at the left with an A needle, followed by a B needle, etc.

Diagrammatic Figures 39, 40, 41, 42, are comparable to the respective illustrations of Figs. 47, 48, 49 and 50. That is to say, Figs. 39 and 47 show the relation of the silk thread 39 and rubber-like strand 7 to a group of twelve needles at the first feed; Figs. 40 and 48 show the relation thereof at feed No. II; Figs. 41 and 49 show the relation thereof at feed No. III; and Figs. 42 and 50 show said relation at feed No. IV. It will be understood, of course, that there is only a single rubber-like strand 7 introduced in a total of four feeds, whereas there are four silk threads 39 introduced in a total of said four feeds. In Fig. 39, the hook side of the needle is toward the observer and this is true of each of Figs. 40, 41 and 42. In Fig. 47, the hook side of the needle is away from the observer as is clearly evident, and this is true also of Figs. 48, 49 and 50.

In Fig. 39, which indicates what happens at the needles at feed No. I, it will be noted that the rubber-like strand 7 lies on the outside (that is, on the hook side) of all the A needles and at the back of the shanks of all the B needles, and that the silk thread 39 is kinked or corrugated or bent into loop form at each of the needles. In dotted lines is shown a previous part of the structure of the fabric not necessary to refer to, and the same is true of each of Figs. 40, 41, 42.

In each of Figs. 39 to 42, I have designated the silk thread which is introduced at feed No. I as 39, and in Figs. 40, 41 and 42 I have designated the silk threads introduced at the second, third and fourth feeds at 39'', 39''' and 39''''.

It will be observed that in Fig 40, there is in process of formation a tuck stitch at every A needle. It will be observed in Fig. 41 that said tuck stitches are still being maintained at the A needles so far as the silk threads taken at feed No. I and feed No. II are concerned and that for feed No. III a tuck stitch is also in process of formation at the first of every group of four needles beginning with the first A needle at the left. It will be observed that in Fig. 42 at the feed No. IV all said tuck stitches previously referred to have been cast off (and that at every B needle a tuck stitch is in process of formation which will be cast off at feed No. I).

In Figs. 43, 44, 45, 46, I have represented three needles (namely, the same three needles) with the threads that are thereon or thereat at each of the four feeds Nos. I, II, III, IV.

Referring to Figs. 37, 37a, 38, 38a, it will be noted that the silk or other threads 39, 39'', 39''' and 39'''' are differently hatched so that the threads introduced at each of the said four feeds can be readily identified. The rubber-like strand 7 which is introduced only at the feed No. I is also contrastingly hatched. Fig. 37 is an inside face view, and Fig. 38 an outside face view, of sufficient of the fabric as formed at the said four feeds, about fifteen courses being indicated in said figures, this including the travel of the fabric four times past each of said feeds, so that apparently the rubber-like strand 7 has been introduced four times, This is apparent only because it is evident that the rubber-like strand as well as all of the usual knitting threads lie in a spiral manner in the fabric.

It will be observed, viewing Figs. 35, 36, 37, 38, that the result of employing a stitch variation (here shown as a tuck stitch formation) is to effect the laying of the rubber-like strand 7 in a slightly sinuous path. This enhances the lateral expansibility of the fabric as said strands 7 may be and are drawn straight in laterally stretching the fabric before expansion of the rubber material actually begins. The provision of the tuck stitch structure not only provides for the sinuous laying of the rubber-like strand 7 but enhances the lateral and the lengthwise expansibility of the knitted fabric as regards the silk threads 39, etc. Thus the employment of a stitch variation in knitting the threads 39, etc. directly cooperates with the rubber-like strands 7 to cause them to render the fabric more highly expansible in both directions than heretofore. Moreover, the rubber-like strands 7 are more intimately incorporated into the actual structure of the fabric than has heretofore been accomplished. Notwithstanding that the fabric is a plain knit fabric as compared with a rib knit fabric, it is evident from a study of Figs. 35, 36, 37, 38 that the rubber-like strands 7 so lie in the fabric that at alternate needle wales the stitches of the silk thread or threads lie at opposite faces or sides of the said rubber-like strands 7.

Merely supplementary to the enhanced expansibility of the fabric, it will be observed that a very distinctive appearance is provided. The structure represented in Figs. 35 to 38 is distinctively one of a diamond or lozenge effect. This is due to the fact that the tuck stitches are so cast off that the larger openings formed thereby are spaced apart by four needle wales and that at each revolution of the needle cylinder and of the fabric carried thereby, the pattern effect is incrementally advanced. That is to say, viewing, for example, Figs. 35 and 36, the next two adjacent occurrences of the strand 7 provide a slight divergence of said two occurrences of said strand at the tuck stitch formations between them, and a nearer approach of the said two occurrences of said strand at either side of said tuck stitch formation. This structure or appearance is repeated with respect to the third and fourth occurrences of said strand 7 and is reversed with respect to the second and third appearances of said strand 7, and so on throughout the fabric.

In practising my invention, I may employ any gauge, whether fine or coarse. In the disclosed embodiment of my invention, I employ a 33 gauge, having 22 needles per inch.

Having thus described the mechanism of my invention and the method practised thereby, it is to be understood that although specific terms are employed, they are used in a generic and descriptive sense and not for purposes of limitation, the scope of the invention being set forth in the following claims.

I claim:

1. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent needles, a needle cylinder therefor, a needle cylinder cam support, means relatively to rotate said needle cylinder and needle cam support, a plurality of spaced feeds distributed about the needle cylinder, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including means to cause stitch variations in closely recurrent needle wales throughout the fabric and the consequent positioning of the rubber-like strand or strands in an undulatory, unknit manner at and by reason of said stitch variations.

2. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent, spring beard needles, each having an individual presser, which are in variant alternation throughout the needle circle, a needle cylinder therefor, a needle cylinder cam support, means relatively to rotate said needle cylinder and needle cam support, a plurality of spaced feeds distributed about the needle cylinder, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including pattern presser means to cause stitch variations in closely recurrent needle wales throughout the fabric and the consequent positioning of the rubber-like strand or strands in an undulatory unknit manner at and by reason of said stitch variations.

3. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent needles, a needle cylinder therefor, a needle cylinder cam support, means relatively to rotate said needle cylinder and needle cam support, a plurality of spaced feeds distributed about the needle cylinder, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including means to cause stitch variations in closely recurrent needle wales throughout the fabric and the consequent positioning of the rubber-like strand or strands in an undulatory, unknit manner at and by reason of said stitch variations, and means to provide a continuing tension control on said rubber-like strand and to vary the tension thereof so as to shape the resulting fabric.

4. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent needles, a needle cylinder therefor, a needle cylinder cam support, means relatively to rotate said needle cylinder and needle cam support, four spaced feeds distributed about the needle cylinder, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including means to cause stitch variations in closely recurrent needle wales throughout the fabric and the consequent positioning of the rubber-like strand or strands in an undulatory, unknit manner at and by reason of said stitch variations.

5. Automatically acting knitting mechanism for the production of a plain knit, highly elastic fabric having tuck stitches in closely recurrent needle wales and having one or more rubber-like strands laid unknit in an undulatory condition at and by reason of said tuck stitches, including, in combination, the following instrumentalities: a circular series of independent needles, a needle cylinder therefor, a needle cylinder cam support, means relatively to rotate said needle cylinder and needle cam support, a plurality of spaced feeds distributed about the needle cylinder, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including means to cause tuck stitches in closely recurrent needle wales throughout the fabric and the consequent positioning of the rubber-like strand or strands in an undulatory, unknit manner at and by reason of said tuck stitches.

6. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent spring beard needles, a needle cylinder therefor, a needle cylinder cam support, means relatively to rotate said needle cylinder and needle cam support, a plurality of spaced feeds distributed about the needle cylinder, means at the first of said feeds to introduce a rubber-like strand, including sinkers at the needles respectively, and having enlarged lower notches for receiving and introducing said rubber-like strand, means to divide the needles at said first feeding point so as to facilitate the introduction of the rubber-like strand, means to introduce at each of the remaining feeds a knitting thread, said previously enumerated elements including means to cause stitch variations in closely recurrent needle wales throughout the fabric and the consequent positioning of the rubber-like strand or strands in an undulatory, unknit manner at and by reason of said stitch variations.

7. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent, spring beard needles, each having an individual presser, which are in variant alternation throughout the needle circle, a needle cylinder therefor, a needle cylinder cam support, means relatively to rotate said needle cylinder and needle cam support, a plurality of spaced feeds distributed about the needle cylinder, a pattern disk presser at one at least of said feeds, notched to press certain needles and not to press the other needles, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including means to cause stitch variations in closely recurrent needle wales throughout the fabric and the consequent positioning of the rubber-like strand or strands in an undulatory, unknit manner at and by reason of said stitch variations.

8. Automatically acting knitting mechanism for the production of a plain knit, highly elastic fabric having stitch variations in closely recurrent needle wales and having one or more rubber-like strands laid unknit in an undulatory condition at and by reason of said stitch variations, including, in combination, the following instrumentalities: a circular series of independent needles, a needle cylinder therefor, a needle cylinder cam support, means relatively to rotate said needle cylinder and needle cam support, a plurality of spaced feeds distributed about the needle cylinder, means at the first of said feeds to introduce a rubber-like strand, means to divide the needles at said first feeding point so as to facilitate the introduction of the rubber-like strand, means to introduce at each of the remaining feeds a knitting thread, said previously enumerated elements including means to cause stitch variations in closely recurrent needle wales throughout the fabric and the consequent positioning of the rubber-like strand or strands in an undulatory, unknit manner at and by reason of said stitch variations, and whereby the normally knit loops of the fabric lie at one side only of the said rubber-like strand or strands.

9. That method of knitting plain knit, highly elastic fabric containing an unknit, rubber-like strand or strands lying in undulatory condition at said stitch variations, including the following steps: introducing non-rubber threads at a plurality of spaced points of the needle series and knitting said threads thereat, introducing in unknit condition a rubber-like strand at the first of said points and in so doing dividing the needles where the rubber-like strand is introduced, forming stitch variations in closely recurrent needle wales throughout the fabric and correlating the creation of stitch variations and the introduction of the rubber-like strand in such a manner that the rubber-like strand is positioned in an undulatory manner at and by reason of said stitch variations.

CHARLES E. DRUMHELLER.